United States Patent [19]

Warncke

[11] 4,256,698

[45] Mar. 17, 1981

[54] CHEMICAL CARTRIDGE FOR RESPIRATORS

[75] Inventor: Ernst Warncke, Lübeck, Fed. Rep. of Germany

[73] Assignee: Drägerwerk Aktiengesellschaft, Fed. Rep. of Germany

[21] Appl. No.: 124,090

[22] Filed: Feb. 25, 1980

[30] Foreign Application Priority Data

Mar. 7, 1979 [DE] Fed. Rep. of Germany ....... 2908913

[51] Int. Cl.[3] ............................ C01F 1/00; C01F 5/00

[52] U.S. Cl. ................................ 422/122; 128/205.12; 422/165; 422/166

[58] Field of Search ............... 422/120, 122, 125, 164, 422/165, 166; 55/DIG. 35; 128/205.12

[56] References Cited

U.S. PATENT DOCUMENTS 3,080,624 3/1963 Weber ................................ 422/125

3,806,323 4/1974 Thompson .......................... 422/122

FOREIGN PATENT DOCUMENTS 785186 8/1935 France .................................... 128/191

*Primary Examiner*—William F. Smith

*Assistant Examiner*—Chris Konkol

*Attorney, Agent, or Firm*—McGlew and Tuttle

[57] ABSTRACT

A chemical cartridge for giving off oxygen for use in respirators, comprises, a container having an oxygen-liberating chemical therein, with a spark plug engaged in the chemical and developing heat and oxygen when started to ignite and aid in the combustion of the chemical. A container of a shape to extend around at least the sides and one end of the spark plug is filled with water and it has an opening which is closed by a plug. The plug is made so that it will open during the burning of the spark plug and supply water to the chemical.

8 Claims, 4 Drawing Figures

CHEMICAL CARTRIDGE FOR RESPIRATORS

FIELD AND BACKGROUND OF THE INVENTION

This invention relates to the construction of cartridges having oxygen-liberating chemicals in general and, in particular, to a new and useful container for supplying oxygen, particularly for respirators, which includes a spark plug for developing heat and oxygen when started which is arranged around the chemical which liberates oxygen so as to aid it in burning and which further includes means for supplying water to the chemical during the burning thereof.

In the known chemical cartridges, even those equipped with an additional spark plug or an ignition device developing oxygen and heat when started to bridge over the initial phase, there may be difficulties with the immediate onset of severe physical stress on the apparatus carrier after the spark plug has burned out, because the production of $O_2$ by the chemical in the cartridge does not yet correspond to the greater need for $O_2$.

A known cartridge for respirators, which is equipped with a chemical giving off oxygen under the action of water vapor and/or $CO_2$, and also with a spark plug developing oxygen and heat when started to bridge over the initial phase of the chemical reaction, has an additional mass around the spark plug which gives off water vapor and/or $CO_2$ under the action of the heat generated by the spark plug. This mass, arranged around the spark plug or fused-on or sintered-on, contains chemically bound water. Due to the requirement that the mass may only have a low water vapor pressure, or otherwise the water would enter the chemical of the cartridge during storage thereof, a relatively large amount of heat is required to separate the water from the chemical compound. In order to be able to generate an equal amount of water vapor, as it is formed directly from the water, the mass with the chemically bound water would have to have triple or quadruple the volume of the water volume. See German Auslegungsschrift No. 26 09 692.

SUMMARY OF THE INVENTION

The present invention provides a chemical cartridge, particularly for respirators, which supplies a sufficient amount of oxygen when started, even with severe physical stress on the apparatus carrier.

In accordance with the invention, a chemical cartridge for giving off oxygen, particularly for respirators, comprises, a container which has an oxygen-liberating chemical therein. A spark plug which develops heat and oxygen when it is started is arranged adjacent the chemical and provides a starting aid therefor. The spark plug is surrounded on at least its sides and one end by a container of generally ring-shaped configuration which is filled with water. The container has an opening for the outflow of water into the chemical during the operation thereof, which is closed by a plug which becomes removed from the container to supply the water either as a result of heat or pressure.

The advantages of the present invention clearly lie in the use of liquid water or of water vapor developing therefrom. The arrangement in the ring-shaped container around the spark plug solves the problem of space in a simple manner, particularly since only one-third to one-fourth of the space is required, compared to the solutions using chemically bound water. Heat is only required for the introduction of the water into an easily opening pressure fastener. The amount of heat generated beyond that is available in the initial phase for the reaction of the chemical and it thus accelerates the production of oxygen.

Accordingly, it is an object of the present invention to provide a chemical cartridge for giving off oxygen, particularly for respirators, which comprises, a container which has an oxygen-liberating chemical therein and a spark plug developing heat and oxygen when started, arranged adjacent the chemical and providing a starting aid therefor, and a container of a shape to extend around at least a side of the spark plug which is filled with water and which may be supplied to the chemical through an opening upon removal of a plug sealing the opening.

A further object of the invention is to provide a chemical cartridge, particularly for respirators, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
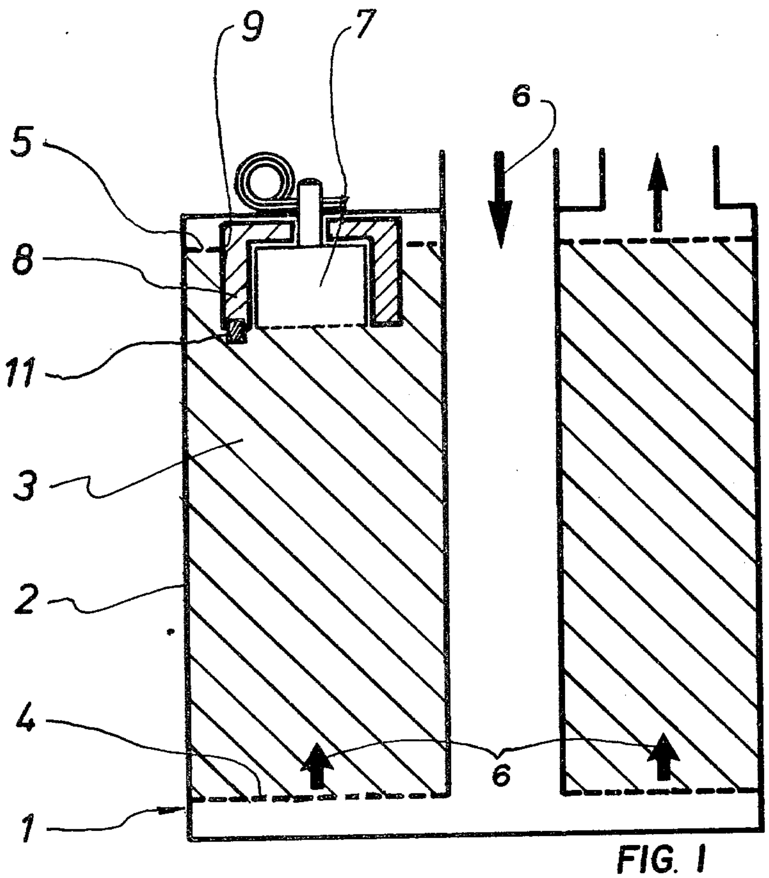
FIG. 1 is a schematic sectional view of a cartridge constructed in accordance with the present invention.
Figure 2:
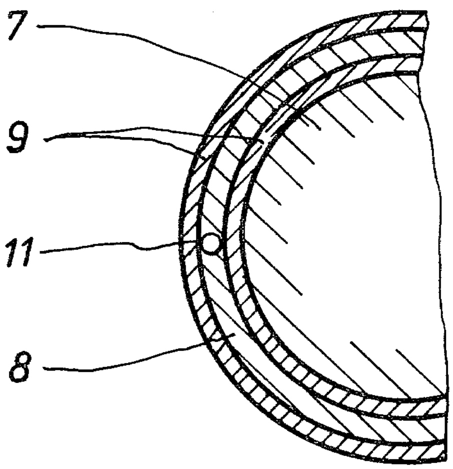
FIG. 2 is a partial horizontal cross-section of the cartridge spark plug shown in FIG. 1.
Figure 3:
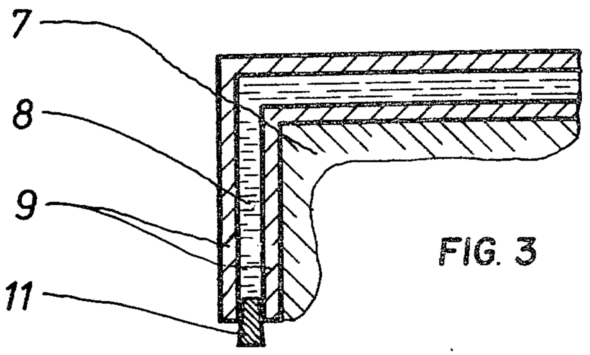
FIG. 3 is an enlarged partial sectional view of the cartridge shown in FIG. 1, showing the sealing plug.

Referring to the drawings in particular, the invention embodied therein in FIGS. 1 to 3, comprises, a chemical cartridge, generally designated 1, for giving off oxygen, particularly for use with respirators.

Chemical cartridge 1 comprises a container 2 having a chemical 3, namely, potassium peroxide ($KO_2$) which is arranged between screens 4 and 5 and is traversed in the direction of arrow 6 by respiratory air of a person using the cartridge. During its passage, the respirator air absorbs oxygen released from chemical 3. Spark plug or ignition device 7 is a chlorate plug which acts as an ignition plug.

In order to bridge-over the initial phase with the lower oxygen production, from chemical 3, water or water vapor is fed additionally to the chemical as a starting aid. The known spark plug 7 equipped for ignition with the exception of its underside is surrounded by a ring container 9, embracing the plug 7, which is filled with water 8. Ring container 9 is in heat contact with the spark plug 7. The water can be a NaCl—solution for use of the chemical cartridge 1 at low temperatures.

After the start, heat of reaction is released, together with the oxygen, due to the reaction of spark plug 7. As a result, the water 8 in the ring container 9 expands and evaporates. A plug or foil fastener 11 is forced out so that the water 8 can flow into the chemical 3 so as to provide the spontaneous production of oxygen. The apparatus carrier is thus supplied with a sufficient amount of $O_2$ even at startup.

Figure 4:
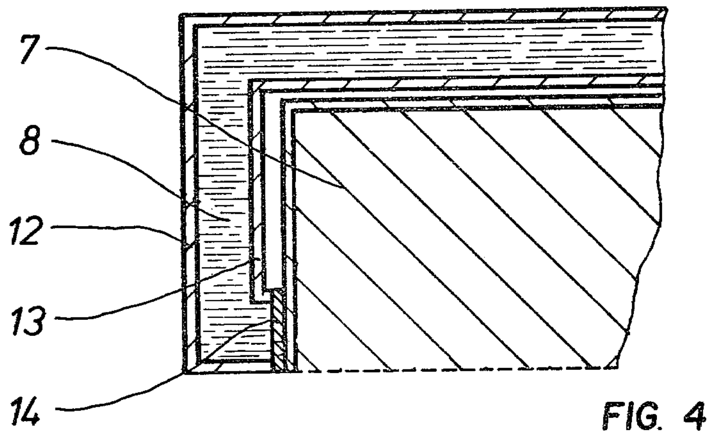
FIG. 4 is a view similar to FIG. 3 of another embodiment of the invention.

According to the embodiment of FIG. 4, ring container 12, along with its bottom part 13, is in direct heat contact with spark plug 7. It can be made of a low melting material, which melts in the initial phase at the contact point, so that an opening for water 8 is formed, or it can be closed at this point by a thermoplastic fastener 14 which then opens.

While specific embodiments of the invention have been shown and described in detail to illustrate the application of the principles of the invention, it will be understood that the invention may be embodied otherwise without departing from such principles.

What is claimed is:

1. A chemical cartridge, for giving off oxygen, particularly for respirators, comprising, a container having an oxygen-liberating chemical therein, a spark plug developing heat and oxygen when started arranged adjacent said chemical and providing a starting aid therefor, and a container of a shape to extend around at least the sides of said spark plug and being filled with water and having an opening for supplying water to said chemical, and plug sealing means closing the opening and being removable after starting said spark plug to supply water to said chemical.

2. A chemical cartridge, as claimed in claim 1, wherein said plug sealing means comprises a pressure fastener engaged in the opening of said container.

3. A chemical cartridge, as claimed in claim 2, wherein said pressure fastener comprises a pressure plug.

4. A chemical cartridge, as claimed in claim 2, wherein said pressure fastener comprises a foil fastener.

5. A chemical cartridge, as claimed in claim 1, wherein said container comprises a ring-shaped container of a thermoplastic material having a bottom in contact with the chemical.

6. A chemical cartridge, as claimed in claim 1, wherein said container comprises a ring-shaped container having a bottom edge engaged in the chemical with an opening therein containing said plug sealing means.

7. A chemical cartridge, as claimed in claim 1, wherein said container comprises a ring-shaped container having a lower end portion engaged with said spark plug, said lower end portion including a thermoplastic fastener engaged in the opening and being removable by heat to open the opening to permit the water to flow to said chemical.

8. A chemical cartridge, as claimed in claim 1, wherein said container comprises a ring-shaped container forming the outer jacket of said spark plug.

* * * * *